Oct. 2, 1923.

J. T. LISTER

HOSE

Filed June 28, 1920

1,469,519

Inventor
John T. Lister.
by Thurston Kwis & Hudson
Attys.

Patented Oct. 2, 1923.

1,469,519

UNITED STATES PATENT OFFICE.

JOHN T. LISTER, OF WELLINGTON, OHIO.

HOSE.

Application filed June 28, 1920. Serial No. 392,450.

*To all whom it may concern:*

Be it known that I, JOHN T. LISTER, a citizen of the United States, residing at Wellington, in the county of Lorain and State of Ohio, have invented a certain new and useful Improvement in Hose, of which the following is a full, clear, and exact description.

This invention relates to a rubber and fabric hose.

The principal object of the invention is to provide a hose which is strong and durable, and which can be made in an inexpensive manner.

The hose constituting the subject matter of the present invention is formed of superposed layers of fabric and unwoven cords applied in strip form so that the laps will extend longitudinally of the hose, and in making the hose I utilize composite strips of woven fabric and cords, the cords being in a layer which overlies the fabric and is cemented thereto so that the composite strip can be applied as a unit to the hose being produced, thereby forming two layers.

Figure 1:
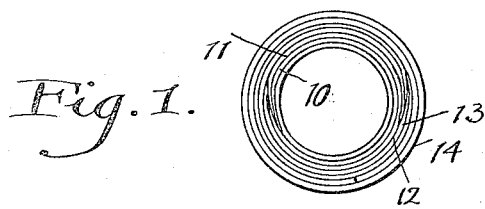
Figure 2:
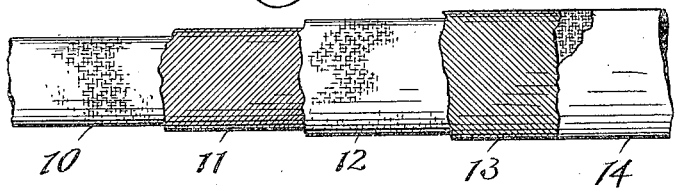
Figure 3:
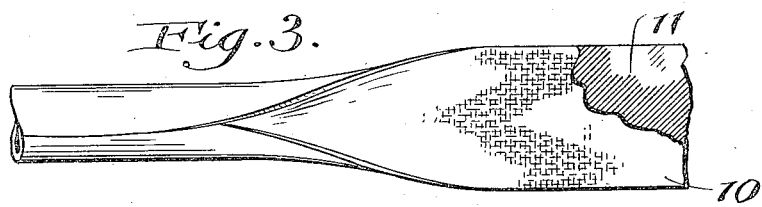
Figure 4:
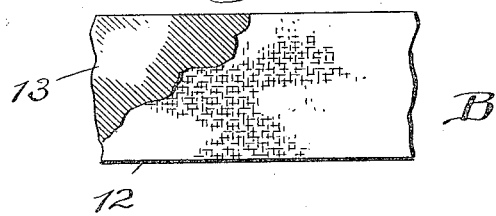
Figure 5:
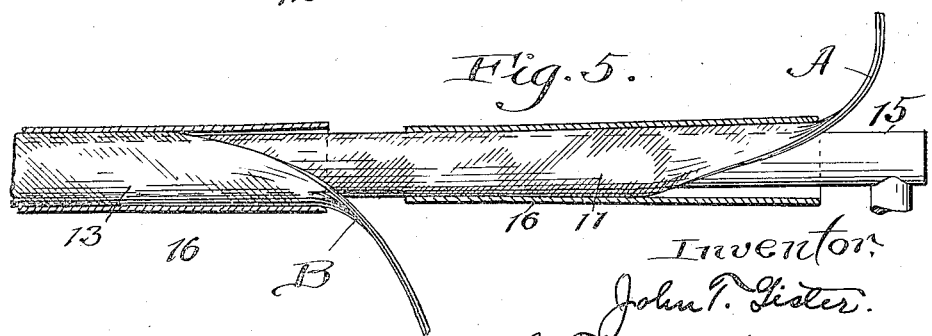

In the accompanying sheet of drawings illustrating my invention somewhat conventionally, Fig. 1 is a transverse diagrammatic view through the improved hose with the thickness of the various layers exaggerated for the sake of clearness; Fig. 2 is an elevation of a short length of the hose with the different layers broken away; Fig. 3 shows one of the composite strips as it appears when being applied on the mandrel to form two layers of the hose; Fig. 4 is a plan view of one of the composite strips with a portion of the cord layer broken away to show the fabric beneath; and Fig. 5 shows one way in which the composite strips can be applied to a stationary mandrel to form the hose.

A hose formed in accordance with my invention preferably consists of a number of superposed layers which consist alternately of woven fabric, preferably rubber frictioned, and unwoven cords, preferably rubberized. In this instance the hose has an inner layer 10 of the fabric on which is superposed a layer 11 of cords overlaid by a second layer of fabric 12, covered by a second layer 13 of cords. These four layers in this instance constitute the body or strength giving portions of the hose, though the number of layers could be increased over that shown. Additionally, regardless of the number of alternate layers of fabric and cord, the hose is surfaced with a binder 14 which can consist of a layer of cord or fabric, preferably the former, covered with a surface of rubber. A hose thus formed, after vulcanization has a great deal of strength and is well adapted for transmitting high pressure fluid such as water or air.

In forming the body of the hose the layers 10, 11, 12 and 13 are preferably applied in pairs. To do this I form composite strips such as illustrated at A in Fig. 3, and B in Fig. 4, each consisting of a strip of rubberized woven fabric and a layer or strip of rubberized cords which adheres to the fabric and is of the same dimensions as the latter, the cords preferably extending across the strip in a diagonal direction.

The width of the composite strips A and B are such that when applied to a mandrel over which the hose is adapted to be formed, the longitudinal edges will overlap, as indicated in Fig. 1, and the two composite strips, or more than two, in case the body of the hose has more than four layers, are preferably so applied that the lap of one composite strip is displaced with reference to the lap of the other. When the body is formed of four layers, as in Fig. 2, the lap or joint of one composite strip is preferably displaced 180° from the lap or joint of the other strip. When the cords are disposed diagonally of the fabric as shown, the cords of one layer are preferably inclined in the opposite direction with respect to the cords of the other layer.

The novel features of my improved method reside chiefly in the utilization of the composite strips, or in applying simultaneously a layer of fabric and a layer of the cord. The precise mechanism utilized in carrying out the method is immaterial to the present invention as the strips can be applied with many different instrumentalities which involve either a stationary mandrel or movable mandrel. In Fig. 5 I have illustrated one way in which this can be done, this consisting in applying the composite strips A and B at two different points onto a stationary mandrel 15 by feeding the strips into the open ends of slightly flaring tubes 16 and drawing the hose body thus formed, lengthwise of the mandrel. In this case the tubes will be of such diameter that though a strip will be supplied to the large end of each tube, the taper of the tube will cause it to conform to the mandrel and will press it onto the same sufficiently hard to lap and compress the edge portions so that during vulcanization a perfect joint will be formed. It will be understood that the strip first applied will form the two innermost layers, and that the second strip is applied onto the tube produced from the first strip so as to form the next two layers of fabric and cord respectively. The binder 14 can be applied in the same way that the strips A and B are applied, or this can be applied subsequently after the strips A and B have been formed in tubular shape on the mandrel.

Having described my invention, I claim:

1. A hose having a body portion composed of a plurality of superposed layers of woven fabric and unwoven cord in the form of strips having their longitudinal edges extending lengthwise of the hose.

2. A hose having a body portion composed of superposed layers of rubberized fabric and cords adhering together, and having their longitudinal edges lapped and extending longitudinally of the hose.

3. A hose having a body portion composed of alternate layers of rubberized fabric and cords adhering together, each layer of fabric and an adjoining layer of cord being in the form of a strip having coincident lapped longitudinal edges.

In testimony whereof, I hereunto affix my signature.

JOHN T. LISTER.